United States Patent
Schulze

(10) Patent No.: US 7,866,052 B2
(45) Date of Patent: Jan. 11, 2011

(54) CONCRETE PANEL REFERENCE POINT MARKING SYSTEM

(76) Inventor: Todd M. Schulze, P.O. Box 4252, Mooresville, NC (US) 28117

( * ) Notice: Subject to any disclaimer, the term of this patent is extended or adjusted under 35 U.S.C. 154(b) by 31 days.

(21) Appl. No.: 12/479,887

(22) Filed: Jun. 8, 2009

(65) Prior Publication Data
US 2009/0307913 A1 Dec. 17, 2009

Related U.S. Application Data

(60) Provisional application No. 61/060,823, filed on Jun. 12, 2008.

(51) Int. Cl.
*G01B 11/26* (2006.01)
*G01B 11/03* (2006.01)
(52) U.S. Cl. .................. 33/1 G; 33/286; 33/DIG. 21
(58) Field of Classification Search ............. 33/1 G, 33/1 BB, 1 CC, 227, 228, 286, DIG. 21
See application file for complete search history.

(56) References Cited

U.S. PATENT DOCUMENTS

| | | | | |
|---|---|---|---|---|
| 4,261,542 A | * | 4/1981 | Lefebvre | 249/11 |
| 4,383,373 A | * | 5/1983 | Couturier | 33/286 |
| 4,580,345 A | * | 4/1986 | Andrew | 33/21.3 |
| 4,598,481 A | * | 7/1986 | Donahue | 33/288 |
| 4,691,446 A | * | 9/1987 | Pitches et al. | 33/516 |
| 5,388,318 A | * | 2/1995 | Petta | 29/407.04 |
| 5,757,499 A | * | 5/1998 | Eaton | 356/620 |
| 5,920,394 A | * | 7/1999 | Gelbart et al. | 356/615 |
| 6,505,406 B2 | * | 1/2003 | Robertson et al. | 33/1 G |
| 6,725,551 B1 | * | 4/2004 | Sutton | 33/286 |
| 6,901,673 B1 | * | 6/2005 | Cobb et al. | 33/502 |
| 7,614,154 B2 | * | 11/2009 | Cobb | 33/1 BB |

\* cited by examiner

*Primary Examiner*—Christopher W Fulton
(74) *Attorney, Agent, or Firm*—Dennis G. LaPointe

(57) ABSTRACT

A concrete panel pre-pour marking system in the form of a portable stand that includes a central reference pointer at the bottom end of the stand that is used as a starting point. The upper end of the stand has a computer processor, keypad, display screen and a device for reading pre-saved construction drawings for the panels to be formed. Key points for locating panel corners, arches, lift inserts, reveals, openings, and other required features are identified with a projection of laser beam(s) to the specific point on the surface upon which the forms are to be laid out and the concrete to be poured.

2 Claims, 4 Drawing Sheets

CONCRETE PANEL REFERENCE POINT MARKING SYSTEM

RELATED APPLICATION

This application claims the benefit of U.S. Provisional Patent Application Ser. No. 61/060,823 filed Jun. 12, 2008.

FIELD OF THE INVENTION

The invention relates to concrete wall panels formed and poured on a slab for tilt-up construction of wall panels, and more particularly, to the marking of desired reference points on the wall panels prior to the pouring of the concrete to form the wall panel.

BACKGROUND OF THE INVENTION

Currently, a wall panel has to be laid out manually using a tape measure and other mechanical tools to locate the corners of the wall panel, the locations of critical points to locate lift inserts, reveals, personnel doorways, garage doorways, arches, window openings, rebar grids, joist pocket locations, girders, weld plates, scupper locations (opening in the wall of a building through which water can drain from a floor or flat roof) and other desired features to be added to a wall panel.

This is a very time-consuming effort and inevitably leads to errors that result in unexpected difficulties in the crane handling the wall panels or in installing girders, joist, doorways, etc. Some of the problems that result when the lift inserts are not properly located results in dangerously hanging panels that the ground crew and crane operator must somehow safely handle, without endangering their lives and safety.

What is needed is a more accurate, less time consuming system that provides the marking for desired reference points prior to forming and pouring the concrete.

SUMMARY OF THE INVENTION

The present invention generally is a concrete panel pre-pour marking system in the form of a portable stand that includes a central reference pointer at the bottom end of the stand that is used as a starting point. The upper end of the stand has a computer processor, keypad, display screen and a device for reading pre-saved construction drawings for the panels to be formed. Key points for locating panel corners, arches, lift inserts, reveals, openings, and other required features are identified with a projection of laser beam(s) to the specific point on the surface upon which the forms are to be laid out and the concrete to be poured.

DETAILED DESCRIPTION OF THE INVENTION

Figure 1:
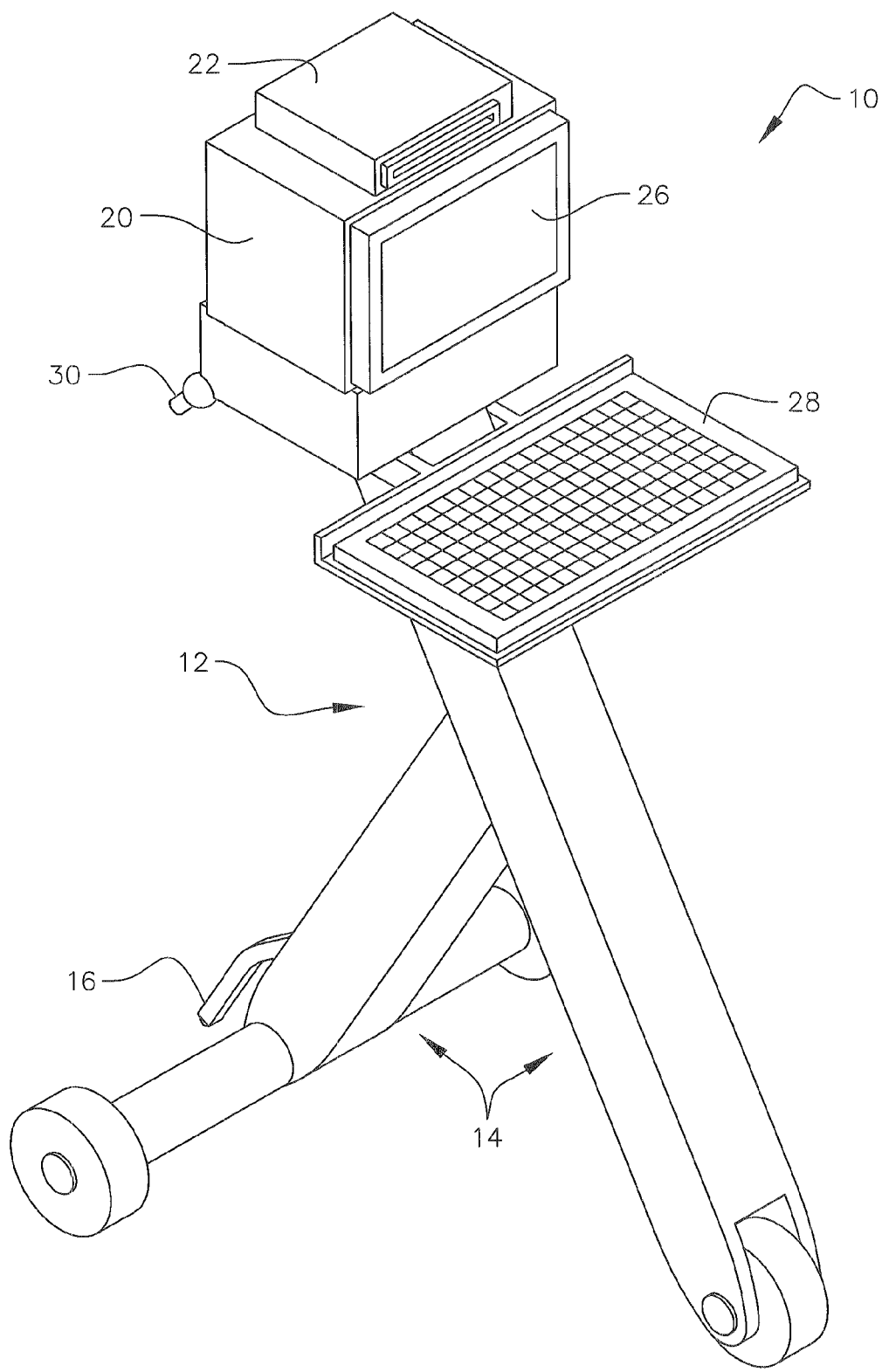
FIG. 1 is a perspective representational and conceptual depiction of the present invention apparatus.
Figure 2:
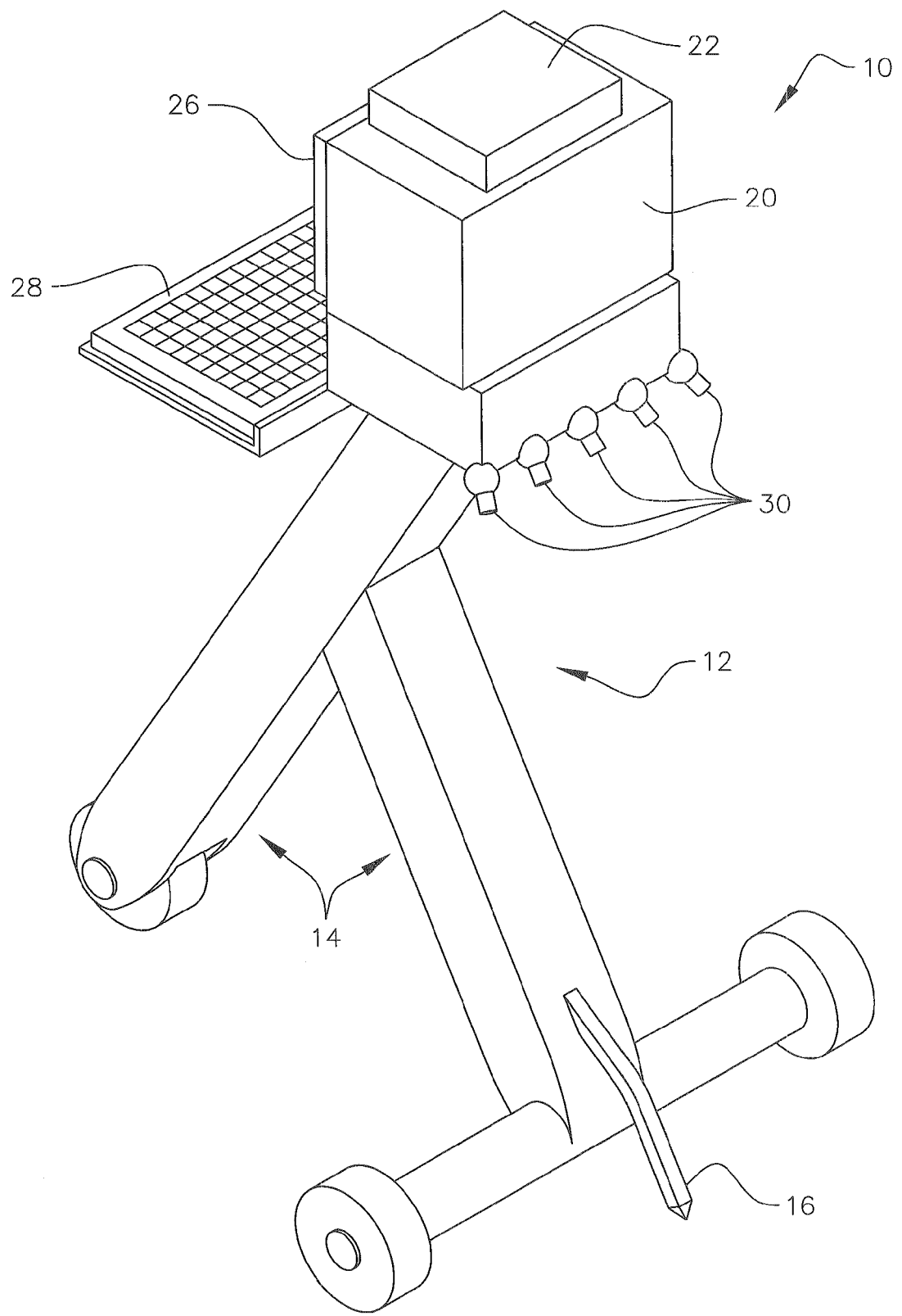
FIG. 2 is a perspective representational and conceptual depiction of the present invention apparatus depicted in FIG. 1 from the back side of FIG. 1.
Figure 3:
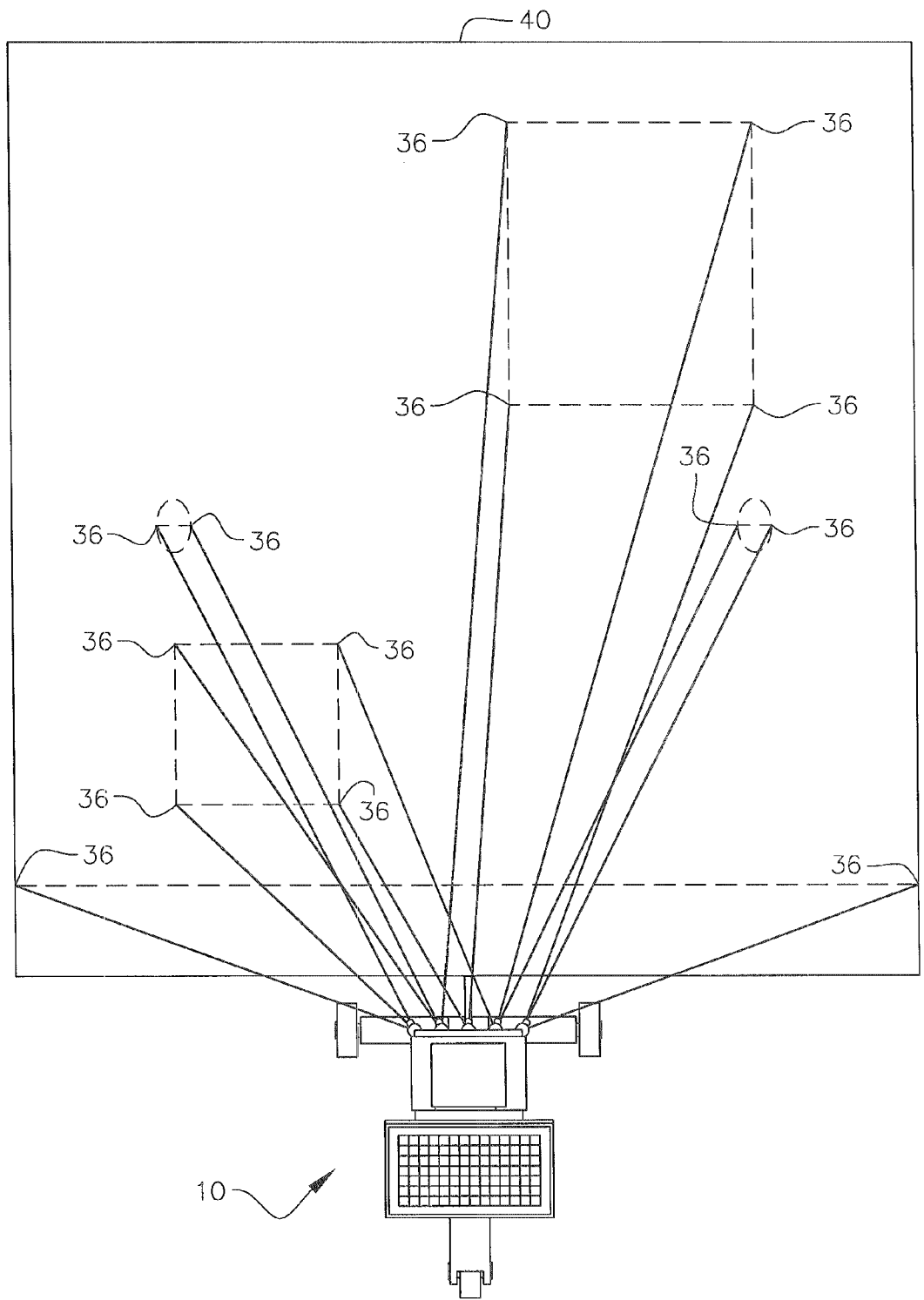
FIG. 3 is a conceptual depiction of the present invention in use projecting laser beams to various desired points on the projected panel to be poured, including points for personnel and garage doorways.
Figure 4:
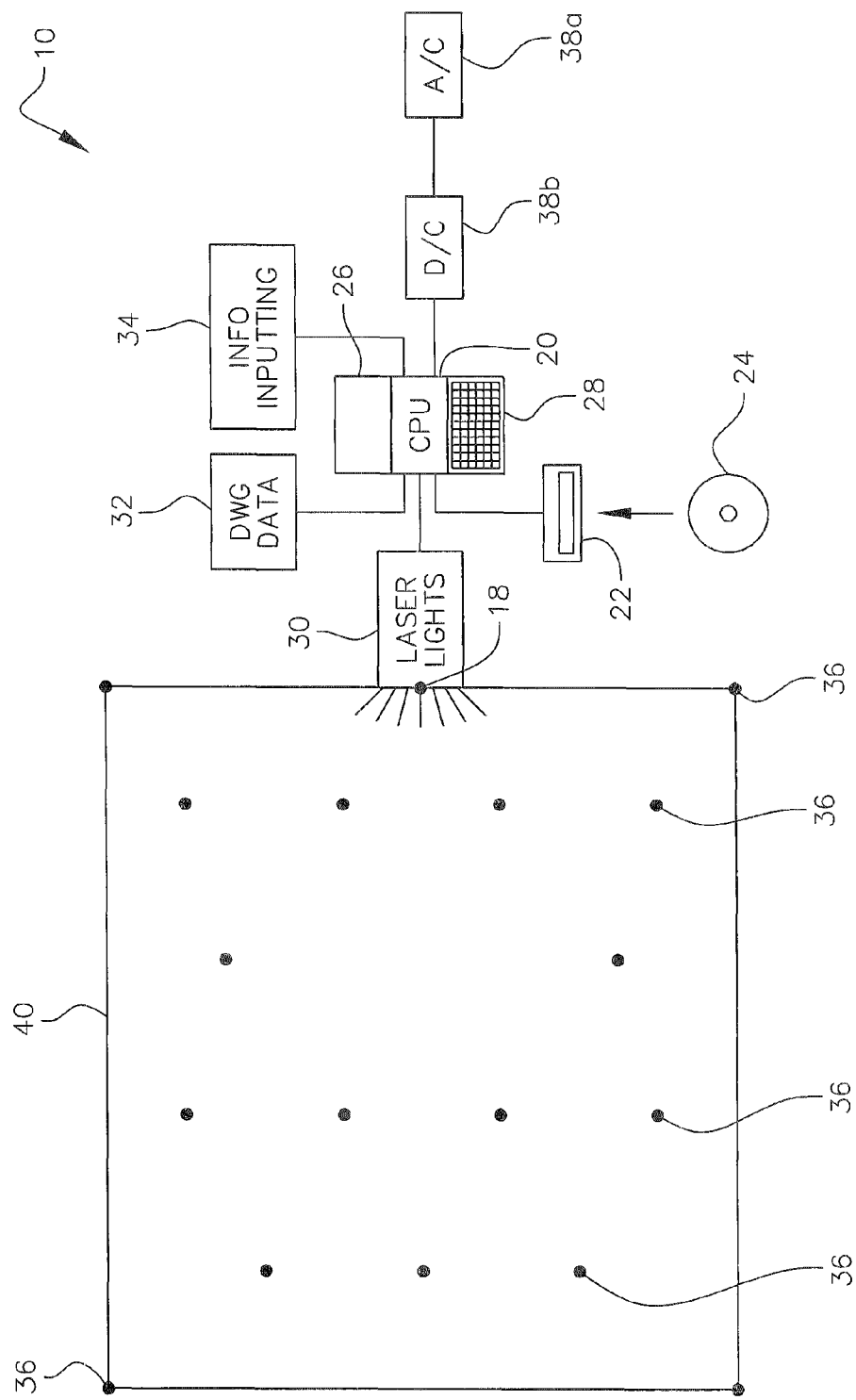
FIG. 4 is a conceptual schematic flow chart and in-use depiction of present invention.

Referring now to the drawings, FIGS. 1-4 disclose the present invention, which is a concrete panel pre-pour marking system, and is depicted generally as 10.

The concrete panel pre-pour marking system 10 includes a portable stand 12 with means 14 at the lower end of said portable stand 12 for supporting the stand 12 in an upright orientation from a generally level floor surface. This can be done in a number of ways such as a tripod leg system or using legs similar to that used on some stationary exercise bike machines like that depicted in the drawings by way of example. The legs may incorporate wheels for ease of maneuverability.

The portable stand 12 has at its lower end a reference member 16 configured to generally point to a designated starting point 18 on the generally level floor surface. This can be simple pointer bar that is and its position on the stand 12 is calibrated and accounted for in the operating software of the system 10 to be the reference starting point from which all other desired reference locations are identified.

The upper end of the portable stand 12 has computer programmable processing means for processing software related to the desired features of concrete wall panels 40 to be formed and poured. This can be in the form of a processor 20 housed at the upper end of the stand 12. Integrated or incorporated into the system 10 is a computer medium device 22 for reading previously saved data 32 on a recordable medium 24 related to specific concrete wall panels 40 to be formed. The device 22 is in electrical communication with the programmable processing means or processor 20. The device 22 can be a DVD player, a CD player, a tape cartridge or floppy diskette player or any similar device. It may operate as a Blue-Toothed device or a wireless device. The operating system can be based on a Windows platform or MAC platform or other platforms known in the art. A programmer skilled in the art, given the operating parameters and write source code to generate a program that will interpret the saved drawing data, transfer the coordinates to the laser beam lights 30 and activate the lights 30 to project a beam to the desired coordinates on the floor for marking.

A display screen 26 in electrical communication with the processor 20 is provided for viewing inputted information 34 and the previously saved data 32 (construction drawing layouts for each wall panel 40) from the recordable medium 24.

A keypad 28 is included for inputting information 34 in the programmable processing means 20 and for initiating operational features of the system 10.

Upon initiating a demand for projecting a laser light beam to the resultant marking points 36, a laser light 30 is activated so as to project and direct a beam to one or more desired reference or marking points 36 on the generally level surface to mark the one or more desired reference points 36 prior to forming and pouring concrete to make a desired concrete wall panel 40. The marking points 36 are programmed to be in relation to the designated starting point 18 and the one or more desired reference points or marking points 36 are selected from the saved data 32 for a selected concrete wall panel 40 to be formed and poured.

The system 10 can be powered electrically using an alternating current (AC source) 38*a*, a direct current source (DC source) 28*b* or be configured to operate selectively by either type of current.

Typical marking points 36 identified by the system projected beams are markings for locations of corners and shapes of the wall panel, lift inserts, reveals, wall openings, weld plates, girders, joist pockets, scuppers, rebar grids and any combinations thereof.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A concrete panel pre-pour marking system comprising:
   a portable stand with means at the lower end of said portable stand for supporting the stand in an upright orientation from a generally level floor surface;
   said portable stand having at its lower end a reference member configured to generally point to a designated starting point on said generally level floor surface;
   an upper end of said portable stand having programmable processing means for processing software related to desired features of concrete wall panels to be formed and poured, a computer medium device for reading previously saved data on a recordable medium related to said concrete wall panels to be formed and poured in electrical communication with said programmable processing means, a display screen in electrical communication with said programmable processing means for viewing inputted information and said previously saved data from the recordable medium, keypad means for inputting said information in said programmable processing means and for initiating operational features of said system;
   means for directing a laser light beam to one or more desired reference points on said generally level surface to mark said one or more desired reference points prior to forming and pouring concrete to make a desired concrete wall panel, wherein said one or more desired reference points are in relation to said designated starting point and said one or more desired reference points are selected from the saved data for a selected concrete wall panel to be formed and poured.

2. The system according to claim 1, wherein said system is powered electrically with an AC source, a DC source or a combination of said AC and DC sources.

* * * * *